United States Patent [19]
Keyser et al.

[11] Patent Number: 5,626,755
[45] Date of Patent: May 6, 1997

[54] METHOD AND APPARATUS FOR WASTE DIGESTION USING MULTIPLE BIOLOGICAL PROCESSES

[75] Inventors: Gene E. Keyser, Jacksonville; Don M. Holcombe, Orange Park, both of Fla.

[73] Assignee: Micronair, Inc., Jacksonville, Fla.

[21] Appl. No.: 555,153

[22] Filed: Nov. 8, 1995

[51] Int. Cl.$^6$ .................. C02F 3/30; C02F 3/20
[52] U.S. Cl. .................. 210/614; 210/620; 210/626; 210/628; 210/630; 210/96.1; 210/143; 210/151; 210/195.1; 210/205; 210/209; 210/220; 210/903
[58] Field of Search .................. 210/614, 620, 210/623, 626, 628, 630, 96.1, 101, 143, 150, 151, 195.1, 198.1, 202, 205, 209, 903, 220

[56] References Cited

U.S. PATENT DOCUMENTS

| | | |
|---|---|---|
| 3,192,155 | 6/1965 | Bready et al. |
| 3,964,998 | 6/1976 | Barnard . |
| 4,056,465 | 11/1977 | Spector . |
| 4,284,510 | 8/1981 | Savard et al. .......................... 210/614 |
| 4,374,730 | 2/1983 | Braha et al. ........................... 210/630 |
| 4,705,633 | 11/1987 | Bogusch ................................ 210/614 |
| 4,797,212 | 1/1989 | von Nordenskjöld .................. 210/614 |
| 4,818,391 | 4/1989 | Love ..................................... 210/220 |
| 4,842,732 | 6/1989 | Tharp ................................... 210/220 |
| 4,961,854 | 10/1990 | Wittmann et al. . |
| 5,151,187 | 9/1992 | Behmann ............................... 210/205 |
| 5,234,595 | 8/1993 | Di Gregorio et al. .................. 210/903 |
| 5,254,253 | 10/1993 | Behmann ............................... 210/220 |
| 5,304,308 | 4/1994 | Tsumura et al. ....................... 210/614 |
| 5,316,682 | 5/1994 | Keyser et al. . |

OTHER PUBLICATIONS

Worthen, Peter T., "The Chesapeake Bay Plan: Restoring an Estuary in Distress", *Water Engineering & Management*, Sep. 1994.

"Efficient treatment of high strength industrial and municipal wastewater" brochure by Envirex Inc. 1987.

"Rex VLR/SCC System" brochure by Envirex Inc., Bulletin No. 315–156, 1989.

"GAC Fluid Bed Efficient, economical bioremediation of BTEX groundwater" brochure by Envirex Inc., 1992.

"Vertical loop reactors—fine bubble power efficiency without fine bubble maintenance" brochure by Envirex Inc., 1989.

*Primary Examiner*—Neil McCarthy
*Assistant Examiner*—Theodore M. Green
*Attorney, Agent, or Firm*—Cesari and McKenna, LLP

[57] ABSTRACT

Methods and apparatus for treating waste streams utilize controlled introduction of microscopic gaseous bubbles to create, in a single vessel, as many as three separate biological environments in discrete, stratified zones. In preferred embodiments, bubbles of air are introduced at the bottom of the vessel, creating an aerobic zone in this vicinity. Depletion of oxygen by microorganisms resident in this layer creates an anoxic zone that drifts upward, establishing itself above the aerobic layer. The two layers remain segregated due to the intolerance of aerobic microorganisms for the overlying anoxic environment, the sharpness of the interface depending on the degree of intolerance. Preferably, the treatment vessel is used in conjunction with a clarifier in an internal recycle configuration; clear water from the top of the clarifier is conducted away from the system as treated effluent, while a portion of the biomass settling at the bottom of the clarifier is returned to the head of the treatment vessel through a hydrocyclone and screen arrangement to remove inert content, thereby substantially increasing the efficiency of biological waste-digestion processes.

24 Claims, 2 Drawing Sheets

METHOD AND APPARATUS FOR WASTE DIGESTION USING MULTIPLE BIOLOGICAL PROCESSES

BACKGROUND OF THE INVENTION

1. Field of the Invention

The present invention relates to biological treatment of contaminated liquids and effluent, and more particularly to apparatus and methods for the simultaneous application of multiple biological processes to wastewater treatment, biopurification processes and desalination pretreatment.

2. Description of the Related Art

Biological processes to treat contaminated water take many forms. Generally these involve exposure of the waste stream to one or more forms of microorganism that stabilize or digest various of the contaminants. The microorganisms are chosen to complement the waste stream both in terms of sewage contents and chemical environment, since any species of microorganism favors a particular environment with limited tolerance for variation. For example, the activated sludge process utilizes aerobic bacteria that remove the soluble biological oxygen demand (BOD) from wastewater. Practice of this process generally involves conducting wastewater into an aeration basin containing a suspension of digestive microorganisms, thereby forming a "mixed liquor" that is aerated to furnish oxygen for respiration of biomass; the biomass sorbs, assimilates and metabolizes the BOD of the wastewater. After a suitable period of aeration, the mixed liquor is introduced into a clarifier in which the biomass settles, allowing the treated wastewater to overflow into an outlet effluent stream.

An important aspect of traditional wastewater treatment is adequate agitation of the mixed liquor in order to speed contact between the digestive microorganisms and waste materials, which may be suspended or dissolved in the wastewater. Indeed, an optimal amount of turbulence is generally dictated more by economics than by process requirements; high agitation rates are theoretically the most desirable, but are also expensive to attain. See, e.g., U.S. Pat. Nos. 4,961,854, 4,056,465 and 3,964,998.

An exception to this practice involves the use of fixed-growth media, where the biological organisms are maintained on fixed supports rather than dispersed in suspension. In this case mixing is avoided to prevent shear that might remove the biological attached growth. The application of fixed-growth systems is ordinarily restricted to soluble, non-particulate contaminants; in addition, these processes are limited in loading capacity by the surface area of the biological support and the diffusion characteristics of the waste stream.

Fluidized-bed systems represent a combination of suspension and fixed-growth processes, but require added media for surface area, mixing sufficient to maintain homogeneity of the media and its attached biological growth, and periodic or continuous removal of the media for regeneration.

All of these systems ordinarily are limited to one category of microorganism, since differing biological processes vary significantly in terms of multiplication rates, optimum conditions, and preferred inputs and waste products. Most generally, microorganisms for wastewater treatment include aerobic, anaerobic and anoxic species, all of which are sustained by very different (and mutually inconsistent) environments. Process conditions can also restrict the applicability of a particular biological approach. For example, the optimal biological process for a particular wastewater composition might require a longer solids retention time than that afforded by economically feasible complete-mix processes, and exhibit greater throughput needs than can be met with fixed-film and fluid-bed film reactors.

This is unfortunate, since frequently a combination of biological processes would be ideal for treatment of a particular waste composition. Thus, it might be advantageous to combine both nitrifying and denitrifying agents, but the former require substantial dissolved oxygen while the latter can only tolerate minimal (if any) dissolved oxygen. Although some progress in combining processes has been achieved using facultative lagoons, these constructions generally require acres of surface area, are used to process only small amounts of waste, and remain at the mercy of natural weather conditions that can uncontrollably alter process conditions and affect biological viability.

DESCRIPTION OF THE INVENTION

Objects of the Invention

Accordingly, it is an object of the present invention to treat wastewater or biological sludge in a biologically optimal manner.

It is another object of the invention to facilitate simultaneous use of multiple biological processes.

It is a further object of the invention to allow the coexistence, in a single vessel, of multiple biological processes having inconsistent environmental requirements.

Still another object of the invention is to create controlled, multiple biological environments in a single vessel without mixing.

Yet another object of the invention is to control and maintain the relative proportions of each separate biological environment by non-turbulent adjustment of conditions.

It is still another object of the invention to process waste in a single vessel through simultaneous use of aerobic, anoxic and anaerobic microorganisms.

It is yet a further object of the invention to quiescently introduce gas into a single-vessel, multiple-process environment to supply and/or remove nutrients and biological byproducts.

It is another object of the invention to process waste in a single vessel with multiple biological environments whose relative ratios are controlled to meet target oxidation-reduction potentials at one or more effluent points.

Another object of the invention is to remove inert substances from internally recycled waste streams to a treatment vessel.

Still another object of the invention is to remove from recycled waste streams inert substances having sizes similar to those of waste-digestive microorganisms without depleting the stream of such microorganisms.

Summary of the Invention

The foregoing objects are efficiently attained through controlled introduction, into a single treatment vessel, of microscopic gaseous bubbles to create as many as three different biological environments in discrete, stratified zones. In preferred embodiments, bubbles of air are introduced at the bottom of the vessel, creating an aerobic zone in this vicinity. Depletion of oxygen by microorganisms resident in the aerobic zone creates an anoxic region that drifts upward, establishing itself above the aerobic layer. The two layers remain segregated due to the intolerance of aerobic microorganisms for the overlying anoxic environment, with the sharpness of the interface depending on the degree of intolerance. If the anoxic zone is populated by denitrifying microorganisms, which are ideally suited to such a zone, their production of gaseous or dissolved nitrogen creates an overlying anaerobic zone substantially or fully depleted of oxygen, nitrates and nitrites; in addition, under quiescent (i.e., limited mixing) conditions, the dissolved nitrogen gas forms an insulation layer between anaerobic and anoxic zones, thereby contributing to segregation of these zones. Molecular diffusion among zones is sufficient to keep all zones supplied with nutrient and prevent accumulation of dissolved byproducts despite the absence of mechanical mixing.

Equipment for generating bubbles suitable for use in connection with the present invention is described in U.S. Pat. No. 5,316,682, the entire disclosure of which is hereby incorporated by reference. Such equipment avoids turbulent conditions that would be fatal to practice of the present invention. Indeed, as noted in that patent, quiescent conditions can promote formation of a beneficial covering layer of biological solids. In the present case it has been further recognized that properly controlled introduction of such bubbles into waste liquids comprising a combination of microorganisms that require mutually antagonistic environments can result in their simultaneous accommodation; ideally, these waste-digestive microorganisms include aerobic, anoxic and anaerobic varieties. (As used herein, the term "waste-digestive microorganism" refers to any self-sustaining microscopic organism, such as bacteria or protozoa, capable of digesting organic waste components into mineral or gaseous products.)

Thus, in a first aspect, the invention comprises methods and apparatus for achieving multiple discrete zones of environmentally incompatible waste-digestive microorganisms in a single vessel. In a second aspect, the invention comprises means for automatically controlling certain critical parameters so as to maintain, in the treatment vessel, a target level of at least one biological indicator. This indicator is selected in accordance with the type of waste being treated. Ordinarily, the indicator will be at least one of ammonia level; soluble nitrate level; soluble nitrite level; and oxidation-reduction potential (ORP). The latter indicator measures, on an arbitrary scale, the electromotive position of the bulk waste liquid. Key controlled parameters include the gas (generally air) content of the bulk liquid and the degree of turbulence.

Preferably, the treatment vessel is used in conjunction with a clarifier in an internal recycle configuration; clear water from the top of the clarifier is conducted away from the system as treated effluent, carrying soluble mineral residues, while most or all of the biomass settling at the bottom of the clarifier is returned to the head of the treatment vessel through a hydrocyclone and screen arrangement to remove inert content. It has been found, quite surprisingly, that removal of inert content using the screen/cyclone combination substantially increases the efficiency of biological waste-digestion processes (including, but by no means limited to, those utilizing the multiple-zone system of the present invention). Indeed, because much of the inert material removed in accordance herewith is of a size comparable to that of the waste-digestive microorganisms themselves, its mere presence in the waste stream heretofore has gone largely unnoticed.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. General System Configuration

Figure 1:
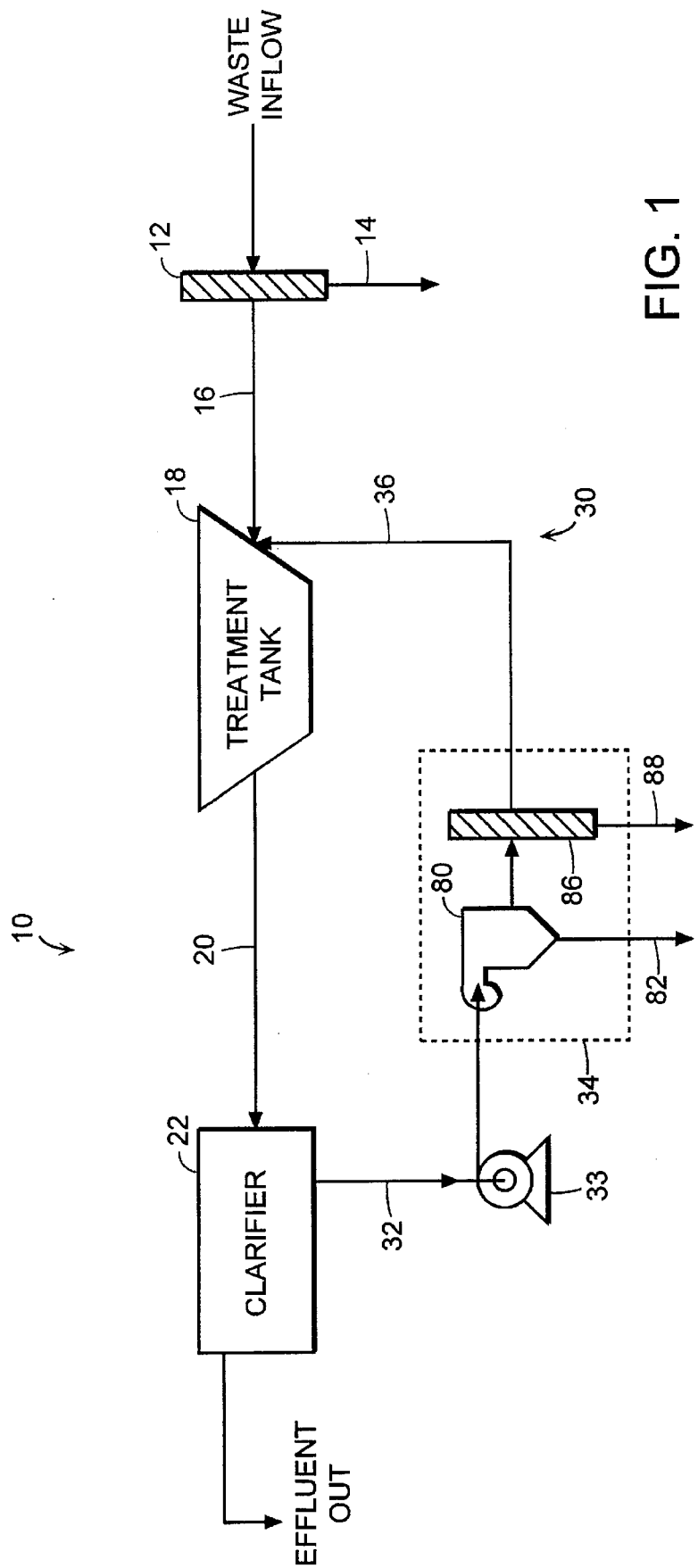
FIG. 1 is a schematic depiction of a preferred system implementing the present invention.

Refer first to FIG. 1, which illustrates a suitable system, indicated generally at reference numeral 10, for the treatment of waste liquid in accordance with the present invention. Waste liquid flowing into the system 10 first encounters a gross filter screen 12 having a mesh size that may range from 25 mm down to 6 mm; the large items of trash accumulating on the receiving face of screen 12 are periodically removed, as indicated by the arrow 14. The screened liquid is conducted along a conduit 16 to a bioreactor treatment vessel or tank 18, where waste-digestive organisms are allowed to digest its biodegradable components. Preferably, the waste liquid contains at least two different forms waste-digestive microorganism each requiring a different chemical environment for survival or at least optimum performance. As discussed in greater detail below, the different forms of microorganism can also be complementary in the sense that each degrades a different type of waste. If the waste liquid lacks a desirable form of digestive organism, this can be introduced directly into vessel 18.

After a start-up period that depends on the concentration of digestible waste in the influent stream, the mixed liquor is continuously conducted from vessel 18 over a conduit 20 to a clarifier 22, where settling takes place, as new influent reaches vessel 18 via conduit 16. Biological solids (so-called "activated sludge") are continuously withdrawn from an outlet point near the bottom of clarifier 22 and recycled to vessel 18 via an internal recycle loop 30, while a clarified portion of the liquid is continuously withdrawn (or allowed to overflow) from an outlet point near the top of clarifier 22 and discarded, thereby maintaining a suitable concentration of biosolids within the system.

Recycle loop 30 comprises a first conduit 32 leading from clarifier 22 to a pump 33, which conveys activated sludge to a removal subsystem 34 and a second conduit 36 leading back to the head of vessel 18. Removal subsystem 34, the details of which are described hereinbelow, is designed to remove inert and nondegradable materials from the biosolids return stream, thereby improving the efficiency of waste treatment.

This general system configuration is suitable for use with a vessel 18 configured for multi-zone waste treatment, as described immediately below; however, because of the general utility of removal subsystem 34, it can also be employed with entirely conventional (i.e., single-zone) treatment processes. Similarly, the utility of multi-zone treatment is not limted to recycle configurations that include a removal system in accordance herewith.

2. Multi-Zone Treatment Vessel

Figure 2:
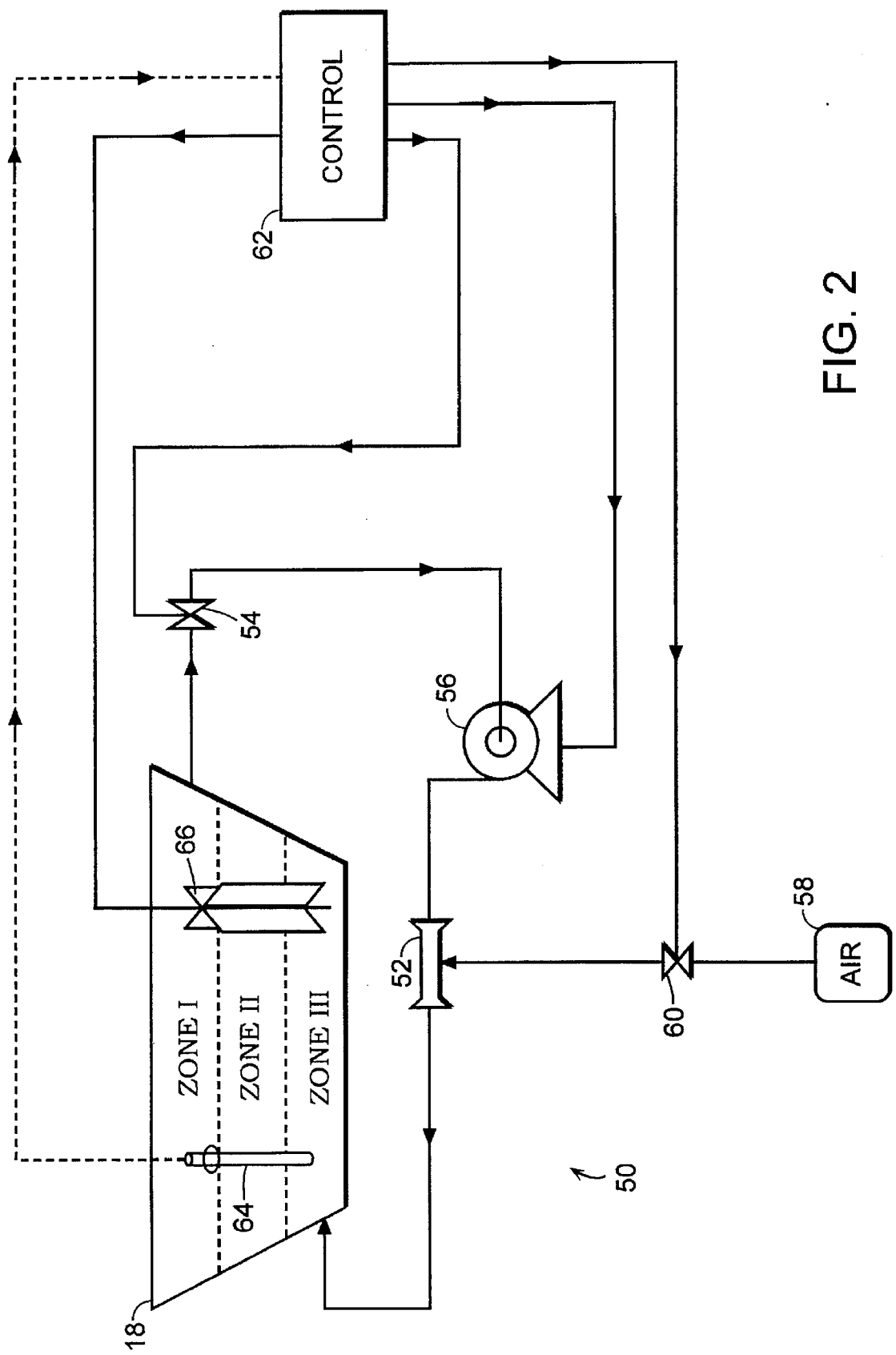
FIG. 2 is a schematic depiction of the control and gas micronizer apparatus of the present invention, suitable for use in conjunction with the treatment vessel shown in FIG. 1.

Refer now to FIG. 2, which illustrates an apparatus that creates and facilitates maintenance of up to three zones in vessel 18. Generally, the apparatus includes a gas micronizer loop and a feedback control system that governs its operation.

The micronizer loop, indicated generally at reference numeral 50, generates microscopic bubbles and introduces them into vessel 18 in a manner that does not cause excessive turbulence. Micronizer loop 50 includes a micronizer element 52 that introduces microscopic bubbles into a stream of liquid flowing therethrough. As more fully discussed in the '682 patent, element 52 preferably includes a cylindrical porous membrane coupled at each end to a tapered conduit. Surrounding the membrane is a coaxial housing, sealed with respect to the membrane and capable of containing gas under elevated pressure. Gas is provided to the housing of element 52 through a sealed, one-way inlet. Accordingly, fluid introduced into either tapered conduit passes axially through the bore of element 52, where it acquires bubbles of gas radially penetrating the pores of the cylindrical membrane.

Waste fluid is continuously withdrawn from vessel 18 through a valve 54 by means of a motor-driven pump 56 and provided to the inlet of micronizer 52. A source of gas (preferably air) 58 feeds micronizer 52 through a valve 60 to form bubbles in the liquid passing therethrough. Upon exiting from micronizer 52, the aerated liquid is reintroduced into the bottom of vessel 18. Introduction of the aerated liquid, which contains submicron bubbles and transports them throughout the bottom region of vessel 18, occurs without substantial turbulence. This is ensured by employing bubbles having mean diameters less than one micron, stored potential energies of at least 10 lbm/ft$^2$-sec$^2$ (where lbm is pounds mass), or a work/area factor of at least 0.5 lbf/ft (where lbf is pounds force). Preferably, stored potential energy exceeds 100 lbm/ft$^2$-sec$^2$ and the work/area factor exceeds 3 lbf/ft.

So long as aerobic and non-aerobic (i.e., anoxic and/or anaerobic) microorganisms exist in the mixed liquor, two or more distinct, stratified chemical environments will develop in vessel 18. Representative aerobic genera, present in a wide variety of sludge compositions, include the bacteria Acinetobacter, Pseudomonas, Zoogloea, Achromobacter, Flavobacterium, Norcardia, Bdellovibrio, Mycobacterium, Sphaerotilus, Baggiatoa, Thiothrix, Lecicothrix and Geotrichum, the nitrifying bacteria Nitrosomonas and Nitrobacter, and the protozoa Ciliata, Vorticella, Opercularia and Epistylis; anoxic genera also typically present include the denitrifying bacteria Achromobacter, Aerobacter, Alcaligenes, Bacillus, Brevibacterium, Flavobacterium, Lactobacillus, Micrococcus, Proteus, Pseudomonas and Spirillum; and anaerobic organisms typically present include Clostridium spp., Peptococcus anaerobus, Bifidobacterium spp., Desulfovibrio spp., Corynebacterium spp., Lactobacillus, Actinomyces, Staphylococcus and *Escherichia coli.* Aerobic nitrifiers oxidize ammonia or amine compounds (such as amino acids) to nitrite and finally to nitrate, while anoxic denitrifiers reduce nitrate to nitrate and finally to nitrogen gas. The simultaneous presence of nitrifiers and denitrifiers has been found highly useful in reducing large quantities of soluble carbonaceous BOD, as well as nitrogen-containing organics, into gaseous products. It is believed that soluble nitrite crosses the interface between aerobic and anoxic zones in large quantities before its conversion, by the nitrifiers, into nitrate; in the anoxic zone, denitrifiers convert the nitrite into nitrogen gas, resulting in an overall net conversion of chemically bound nitrogen into nitrogen gas (which helps maintain separation between anoxic and anaerobic zones in a quiescent environment).

Assuming the presence of all three types of microorgansism, three environments—shown as Zones I, II and III in FIG. 2—develop under sufficiently quiescent conditions. As noted previously, the absence of one or more forms of microorganism can be rectified, if desired, by their direct introduction into vessel 18. Indeed, merely pouring several gallons of activated sludge into the vessel will ordinarily furnish a sufficient seed population of all three classes of organism to generate the zones after a suitable growth period.

Although the foregoing system is entirely adequate to effect multi-zone waste treatment, it is desirable to add some degree of control to attain target levels of indicators important to the treatment of particular waste compositions. The important indicators, as noted previously, include ammonia level; soluble nitrate level; soluble nitrite level; and ORP. These indicators can generally be brought within limits appropriate to the particular type of waste composition by adjusting process parameters such as the air content of the bulk liquid and the degree of turbulence imparted thereto. Desirably, the turbulence imparted to the contents of vessel 18 by the delivered air does not exceed a mean velocity gradient of 100 sec$^{-1}$; 40 sec$^{-1}$ is a typical working value, and 10 sec$^{-1}$ is ideal. However, below this level, changes in mixing energy can be used to control process conditions.

For present purposes, the mean velocity gradient G is given by $$G=(P/\mu V)^{1/2}$$

where P is the power requirement or mixing horsepower from aeration in ft-lb/sec, μ is the dynamic viscosity viscosity in lb-sec/ft$^2$ and V is the tank volume in ft$^3$. P is given by $$P=p_a V_a \ln(p_c/p_a)$$

where $p_a$ is atmospheric pressure in lb/ft$^2$, $V_a$ is the volume of introduced air at atmospheric pressure in ft$^3$/sec, and $p_c$ is the pressure, in lb/ft$^2$, at the point of air discharge into the fluid, or by $$P=35.28Q_a \ln((h+33.9)/33/9)$$

where $Q_a$ is the air flow, in ft$^3$/min, into the fluid at atmospheric pressure, and h is the air pressure at the point of discharge in feet of water.

For example, excess free ammonia, which is ecologically harmful if present in discharged effluent, in the absence of nitrates reflects insufficient aeration. Conversely, excess free nitrate, which can lead to groundwater contamination by solubilizing heavy metals, in the absence of ammonia reflects excessive aeration. Excess ammonia and nitrate reflect incomplete waste mineralization and promote unwanted biological activity at the effluent site; these indicate an insufficient denitrifier population or excessive turbulence (the latter condition being confirmed by a narrow diversity of ORP, which itself indicates excessive turbulence). ORP affects the health of various organism populations, and must therefore be kept within acceptable values. This can be achieved by control of the gross average vessel oxygen content across all zones.

The presence of any of the foregoing adverse conditions can be detected manually, using appropriate chemical and/or electrolytic sensing equipment, and manual steps taken to adjust the appropriate parameter. In particular, the size of the bubbles can be controlled, within limits (as discussed in the '682 patent), by the amount of air from source 58 introduced into micronizer 52 and/or by the velocity of the liquid pumped through micronizer 52. Decreasing the mean diameter of the bubbles results in their production in greater quantity, increasing the degree of aeration. Elevating the mean diameter decreases aeration but, because the bubbles are larger, increases agitation. For most processes, control of bubble size allows the operator to exert sufficient independent control over both aeration and agitation parameters. It is of course possible to impart additional agitation by mechanical means.

Control over process conditions can also be accomplished by automated means, as illustrated in FIG. 2. A controller 62 accepts input data from at least one sensor 64, which produces an output signal representing the magnitude of at least one of the indicators discussed above. The output signal may be digital or analog, depending on the characteristics of controller 62. Suitable sensors are well-characterized in the art; for example, electrode arrangements for measurement of ORP and ammonia are widely available, as are in-line measurement devices for nitrates. Various arrangements and combinations of sensors 64 are possible; for example, vessel 18 may be equipped with a cluster of sensors capable of sensing all relevant indicators, or with multiple clusters spaced apart vertically in regions likely to correspond to discrete zones.

Controller 62 interprets signals from sensors 64 and, based thereon, controls valves 54 and 60 (which are, in this embodiment, electronically actuable) and the speed of pump 56. In addition, to facilitate even greater control over imparted turbulence, the illustrated embodiment includes a paddle stirrer assembly 66, the operation of which is also governed by controller 62; it should be recognized, however, that stirrer 66 is ordinarily not necessary.

Controller 62 can be an analog (e.g., voltage-controlled) device, but is preferably a digital computer programmed with appropriate software to carry out the analysis and control functions. In this embodiment, signals from sensors 64 are converted to digital form by analog-to-digital converters, while the digital control signals generated by controller 62 are transformed by digital-to-analog converters into signals capable of opening and closing valves 54 and 60 to a stepped or continuously selectable degree. The programming necessary to effectuate the analysis and control functions described hereinabove is well within the purview of those skilled in the art, and can readily be accomplished without undue experimentation.

3. Removal Subsystem

Removal of inert, solid substances from sludge prior to its reintroduction into vessel 18 has been found to substantially increase the efficiency of waste digestion. This is due, it is believed, both to biological concentration effects (since removal of inert solids results in reintroduction of sludge having higher microorganism levels) and to reduction of biological toxicity (that results, e.g., from heavy metals susceptible to removal in accordance herewith). Indeed, removal of inerts is beneficial in virtually any biological process employing a recycle sidestream, and this aspect of the invention is therefore useful in a wide variety of waste-treatment applications (e.g., conventional single-zone tanks used independently or in series, or the multi-zone arrangement discussed above).

To understand operation of this aspect of the invention, it is important to appreciate the variety of solids present in typical wastewater. Small (i.e., 1–250 μm in diameter) organic materials include the waste-digestive organisms critical to waste treatment. Larger (>250 μm) organic materials represent various forms of trash. Small and large inorganic particles include inert materials such as sand. Of these categories of solids, only small organics are desirably reintroduced into vessel 18.

Conventionally, a screen having a mesh size of over 5000 μm (0.2 inch) has previously been employed in the internal recycle loop to filter the coarsest particles from the recycle stream. Although such large mesh sizes obviously discourage plugging, these screens are capable of removing only the very largest particles, which typically constitute only a small fraction (generally <5% by weight) of the stream; accordingly, large amounts of solids remain to poison or at least crowd the biology.

The removal subsystem of the present invention is a two-stage assembly that removes, in a first stage, materials of sizes similar to those of biological solids (including waste-digestive microorganisms) but having different specific gravities; and in a second stage, solids ranging in size from large objects (such as those removed by conventional screens) to much smaller particles on the order to 250–350 μm. It must be emphasized that, owing to the continuous nature of the recycling loop, the order in which withdrawn sludge encounters the two stages is not critical.

Preferably, the first stage comprises one or more hydrocyclone units connected in parallel, indicated collectively at reference numeral 80 (and referred to in the singlar for convenience of presentation). Hydrocyclone 80 is configured to remove small inorganic solids similar in size to biological solids but having different (and usually much higher) specific gravities. In particular, hydrocyclone 80 should primarily remove particles in the size range 1–250 μm having specific gravities greater than 1.5.

Hydrocyclones typically operate over a range of particles size/specific gravity combinations, but exhibiting a peak efficiency dictated by the unit's size and construction. For purposes of the present invention, maximum efficiency ideally occurs at particle sizes of 50–60 μm and a specific gravity of about 2.6. In this way, the device will capture at least some very high density particles but avoid entrapment of desirable biological solids, which have specific gravities of about 1.02 to 1.05. Particles collected by hydrocyclone 80 are conveyed for disposal by an outlet line 82. The second stage comprises a static screen having a mesh size between 50 and 500 μm, and preferably 250 μm. Because virtually all waste-degradative biological material is usually no larger than 200 μm, these pass through screen 86 and are reintroduced into vessel 18. Screenings are conveyed for disposal along an outlet path 88. Notwithstanding traditional concerns over possible clogging of screens having such small mesh sizes, this problem has been found not to occur. It is likely that most of the sludge-borne solids are much larger than than the screen mesh, and simply rest against the screen without clogging the pores; in addition, accumulation of large particles can also act to restrain smaller particles that might otherwise cause clogging problems.

The screen/hydrocyclone removal arrangement 34 not only removes otherwise troublesome inert solids, but also facilitates independent control of the ratio of inert content to biological content. The ability to influence this ratio (by varying the mesh size of screen 86 and the retention characteristics of hydrocyclone 80) affords the operator greater control over the settling characteristics of the mixed liquor.

In a representative implementation, the invention was installed in a 0.5 million gallon/day (mgd) wastewater treatment plant using activated-sludge treatment and aerobic digestion with an influent loading of 834 lbs/day of 5-day biological oxygen demand ($BOD_5$=200) and 1250 lbs/day of total suspended solids (TSS). The return activated sludge (RAS) flow along internal recycle loop 30 was maintained at approximately 75% of the influent rate, or 260 gallons/minute (gpm). Removal subsystem 34 consisted of two 6-inch diameter, 10° cyclones operating in parallel at a pressure drop of 15 psig, and a static screen having a mesh size of 254 µm to which the overflow of the cyclones was conducted. The screen outflow was returned to the head of the aeration basin 18 via conduit 36, and screenings accumulated over path 88 were allowed to fall into a screw conveyor inclined at 5° above horizontal. The screw conveyor was sprayed with approximately 0.5 gpm of recycled plant effluent to remove residual biosolids and its contents conveyed, while draining, to a dumpster for disposal. The underflow of the cyclones was discharged through conduit 82 to a secondary cyclone washer for concentration and discharge to the same dumpster. The secondary cyclone washer consisted of a 10-gallon reservoir recirculated through a 2-inch diameter, 10° cyclone at a pressure drop of 20 psig and a flow rate of 25–30 gpm. Excess liquid was returned to the head of the aeration basin 18 over conduit 36 and a concentrated solids stream of 60–80% dry solids discharged for disposal.

The vessel 18 was equipped with two micronizers having the collective capacity to deliver 20 cubic feet per minute of air (or other suitable gas) at standard conditions of temperature and pressure (scfm) into a recirculating liquid stream flowing at a rate of 1200 gpm. The micronizers were arranged as two separate flow loops 50. Normal operation was found to require up to 10 scfm of air into 600 gpm of recirculating flow in order to achieve sufficient digestion of biodegradable materials in the recirculated sludge.

Excess biological solids were transferred from the outfall of the screen out of the normal process flow at a daily rate of 5000–7000 gpd at a concentration of 0.5–1.0% to a digester having a minimum working volume of 70,000 gallons. The overall flow into vessel 18 was chosen to maintain it at liquid capacity during operation.

It was found that implementation of the invention produced substantial process benefits as compared with conventional operation:

|  | Before | After |
|---|---|---|
| Effluent: BOD$_5$ | 5 | 1 |
| TSS | 10 | 3 |
| Mixed liquor suspended solids | 5000 ppm | 3100 ppm |
| Coarse bubble blower requirements, mixing and aeration | 100 hp | 40 hp |
| Digester aeration requirements | 30 hp | 23 hp |
| Mean cell residence time | 45 day | 45 day |
| Inerts residence time | 45 day | 1.3 day |
| Biosolids inventory | 10,425 lbs | 11,327 lbs |
| Inerts inventory | 10,425 lbs | 800 lbs |
| Clarifier loading | 10.5 lbs/day-ft$^2$ | 6.1 lbs/day-ft$^2$ |
| Solids removed from site to maintain steady state | 834 lbs/day | 600 lbs/day |
| Horsepower per mgd | 270 hp | 136.5 hp |

It should be noted that, prior to introduction of the invention, solids removed from the site to maintain steady-state operation were present at a concentration of 1.6%, resulting in a net transportation burden of 50,050 lbs/day. By contrast, because the present invention concentrates solids to 60% levels or better, the maximum transportation burden was 600 lbs/day.

It will therefore be seen that we have developed a highly efficient and efficacious system for wastewater treatment, both in terms of expanding the variety of available digestion processes and improving the overall level of digestion through removal of inert materials from the process stream. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of treating liquid-borne waste containing at least two different types of waste-digestive microorganism, the different types of microorganism requiring mutually incompatible chemical environments and comprising an aerobic and a non-aerobic species, the method comprising:
   a. introducing the waste into a treatment vessel having a bottom region;
   b. continuously introducing a supply of micronized air bubbles into the bottom region of the waste-containing treatment vessel, the continuous supply of air bubbles corresponding to a quantity of introduced air thereby creating in the bottom region an aerobic zone compatible with and containing the aerobic species;
   c. controlling the quantity of introduced air and the degree of agitation of the waste so as to produce in the waste at least one distinct non-aerobic zone vertically adjacent to the aerobic zone having a chemical environment compatible with and containing the non-aerobic species, thereby effecting biodegradation of the waste.

2. The method of claim 1 wherein the bubbles possess at least one of (a) stored potential energies of at least 10 lbm/ft$^2$-sec$^2$; and (b) work/area factors of at least 0.5 lbf/ft.

3. The method of claim 2 wherein the bubbles possess stored potential energies of at least 100 lbm/ft$^2$-sec$^2$.

4. The method of claim 2 wherein the bubbles possess stored potential energies of at least 500 lbm/ft$^2$-sec$^2$.

5. The method of claim 2 wherein the bubbles possess work/area factors of at least 3 lbf/ft.

6. The method of claim 2 wherein the bubbles possess work/area factors of at least 4 lbf/ft.

7. The method of claim 1 wherein the waste comprises aerobic, anoxic and anaerobic waste-digestive microorganisms and the quantity of introduced air and agitation are controlled so as to produce in the waste aerobic, anoxic and anaerobic zones.

8. The method of claim 7 wherein the anoxic zone includes a population of denitrifying microorganisms.

9. The method of claim 8 wherein the aerobic zone includes a population of nitrifying microorganisms.

10. The method of claim 1 further comprising the step of controlling the quantity of introduced air and effecting controlled agitation of the waste so as to maintain at least one biological indicator at a predetermined level.

11. The method of claim 10 wherein the indicator comprises at least one of ammonia level; soluble nitrate level; soluble nitrite level; and oxidation-reduction potential.

12. The method of claim 1 wherein the controlled agitation does not exceed a mean velocity gradient of 100 sec$^{-1}$.

13. The method of claim 1 wherein the bubbles have an average diameter, and agitation is controlled by adjusting the average diameter.

14. The method of claim 1 wherein the bubbles have an average diameter, and the quantity of introduced air is controlled by adjusting the average diameter.

15. Apparatus of treating liquid-borne waste containing at least two different types of waste-digestive microorganism, the different types of microorganism requiring mutually incompatible chemical environments and comprising an aerobic and a non-aerobic species, the apparatus comprising:

a. a treatment vessel having a bottom;

b. means for introducing a supply of micronized air bubbles into the bottom of the waste-containing treatment vessel, the continuous supply of air bubbles corresponding to a quantity of introduced air thereby creating in the bottom region an aerobic zone compatible with and containing the aerobic species;

c. means for imparting a degree of agitation of the waste; and d. control means, coupled to the bubble-introduction means, for controlling (i) the quantity of introduced air and (ii) the degree of agitation to produce in the waste at least one distinct non-aerobic zone vertically adjacent to the aerobic zone, the non-aerobic zone having a chemical environment compatible with and containing the non-aerobic species.

16. The apparatus of claim 15 wherein the means for introducing a supply of micronized air bubbles into the bottom of the waste-containing treatment vessel comprises:

a. microporous element having an average pore size;

b. means for exposing a surface of the microporous element to gas at a predetermined pressure; and c. means for moving a fluid and the microporous element relative to one another with sufficient motive force to achieve a predetermined fluid velocity in excess of 10 ft/sec, wherein the average pore size of the microporous element is less than 1 micron.

17. The apparatus of claim 15 further comprising means for sensing at least one biological indicator in the vessel and generating a signal indicative thereof, the control means being configured to receive the signal.

18. The apparatus of claim 17 wherein the controller responds to the signal by controlling the quantity of introduced air and effecting controlled agitation of the waste so as to maintain the at least one biological indicator at a predetermined level.

19. The apparatus of claim 17 wherein the sensing means senses at least one of ammonia level; soluble nitrate level; soluble nitrite level; and oxidation-reduction potential.

20. The apparatus of claim 15 wherein agitation is supplied by the bubbles, the agitation means being the bubble-introduction means.

21. The apparatus of claim 20 wherein the bubbles have an average diameter, and agitation is controlled by adjusting the average diameter.

22. The apparatus of claim 15 wherein the agitation means comprises mechanical means for imparting turbulence.

23. The apparatus of claim 15 wherein the degree of agitation does not exceed a mean velocity gradient of 100 $sec^{-1}$.

24. The apparatus of claim 15 wherein the bubble-introduction means produces bubbles having an average diameter controllable by the control means, which controls the quantity of introduced air by adjusting the average diameter.

* * * * *